US007619882B2

(12) United States Patent
Nakajima et al.

(10) Patent No.: US 7,619,882 B2
(45) Date of Patent: Nov. 17, 2009

(54) ELECTRONIC APPARATUS

(75) Inventors: Yuji Nakajima, Tokyo (JP); Masato Nakatani, Kawaguchi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 11/804,532

(22) Filed: May 17, 2007

(65) Prior Publication Data

US 2007/0283531 A1 Dec. 13, 2007

(30) Foreign Application Priority Data

Jun. 7, 2006 (JP) ............................ P2006-158817

(51) Int. Cl.
*G06F 1/16* (2006.01)
(52) U.S. Cl. .............................. 361/679.26; 361/679.55
(58) Field of Classification Search ................. 361/681, 361/683; 16/367; 400/595
See application file for complete search history.

(56) References Cited

U.S. PATENT DOCUMENTS

| 5,168,423 | A | * | 12/1992 | Ohgami et al. | ............... | 361/681 |
| 5,205,017 | A | * | 4/1993 | Wang | ........................... | 16/367 |
| 5,206,790 | A | * | 4/1993 | Thomas et al. | ............... | 361/681 |
| 5,335,142 | A | * | 8/1994 | Anderson | .................... | 361/681 |
| 7,047,598 | B2 | * | 5/2006 | Huang | ........................... | 16/312 |
| 7,123,472 | B2 | * | 10/2006 | Huang et al. | ................. | 361/681 |
| 7,155,781 | B2 | * | 1/2007 | Yamada et al. | ................. | 16/367 |
| 2003/0167600 | A1 | * | 9/2003 | Chien et al. | .................... | 16/367 |
| 2005/0198780 | A1 | * | 9/2005 | Liu et al. | ...................... | 16/367 |
| 2007/0285881 | A1 | * | 12/2007 | Nakajima | .................... | 361/681 |
| 2008/0253072 | A1 | * | 10/2008 | Tracy et al. | ................. | 361/681 |

FOREIGN PATENT DOCUMENTS

JP          2004-053927           2/2004

* cited by examiner

*Primary Examiner*—Lisa Lea-Edmonds
(74) *Attorney, Agent, or Firm*—Blakely, Sokoloff, Taylor & Zafman LLP

(57) ABSTRACT

According to one embodiment, an electronic apparatus includes a main body including an input unit placed on an upper face thereof, a display panel including a display surface and a rear surface opposite to the display surface, a hinge section, that joins the display panel to the main body, the hinge section including a pivot shaft pivotably supporting the display panel relative to the input unit and a rotation shaft rotatably holding the display panel relative to the main body, the rotation shaft extending in a different direction from the pivot shaft, and a reception section disposed on the upper face, and including a projection. The projection abuts on an edge of the display panel on which the rotation shaft is disposed, in a direction in which the display panel swings around the pivot shaft.

13 Claims, 10 Drawing Sheets

ELECTRONIC APPARATUS

CROSS-REFERENCE TO RELATED APPLICATIONS

This application is based upon and claims the benefit of priority from Japanese Patent Application No. 2006-158817, filed Jun. 7, 2006 the entire contents of which are incorporated herein by reference.

BACKGROUND

1. Field

One embodiment of the invention relates to an electronic apparatus including a display panel that can be turned between a state in which a display surface is turned down relative to a main body and a state in which the display surface is put on the main body as it is turned up.

2. Description of the Related Art

Portable electronic apparatuses include a notebook electronic apparatus for enabling the user to raise a display panel relative to a main body and further turn the display panel from the state. Such an electronic apparatus includes a hinge part provided with a rotation shaft for rotatably supporting the display panel in the direction of raising the display panel relative to the main body and a pivot for rotatably supporting the raised display panel in the direction of turning the display panel.

An electronic apparatus has a hinge part incorporating an interlock pin for enabling the user to smoothly rotate a display panel with a rotation shaft or a pivot as the center is disclosed in JP-A-2004-53927. The interlock pin operates so as to lessen the rotational resistance of the pivot when the display panel is placed upright relative to the main body and so as to lessen the rotational resistance of the rotation shaft when a display surface of a rear of the display panel is directed to a keyboard.

However, the hinge part provided in the electronic apparatus described in JP-A-2004-53927 needs to be provided with a complicated mechanism for switching between the rotational resistance of the rotation shaft and the rotational resistance of the pivot. The hinge part and its periphery need to have a sufficient strength for holding the display panel in any desired attitude. Considering these points, the hinge part and its periphery become bulky.

As the display panel becomes large, a rotation shaft with large rotational resistance is applied to the hinge part proportionally. For the hinge part described in JP-A-2004-53927, the rotational resistance of the pivot lessens in a state in which the display panel is raised at a predetermined rotation angle with the rotation shaft as the center. Therefore, when the display panel is inclined with the rotation shaft as the center over the range beyond the predetermined rotation angle, if the rotational resistance of the rotation shaft is large, the display panel may rotate in the rotation direction with the pivot as the center accidentally.

Further, the display panel has a latch mechanism at a position opposed to the margin where the hinge part is provided. The latch mechanism fixes the display panel and the main body in a state in which the display panel is put on the main body. If the display panel is large, the latch mechanism cannot well be engaged due to a slight angle shift in the hinge part.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
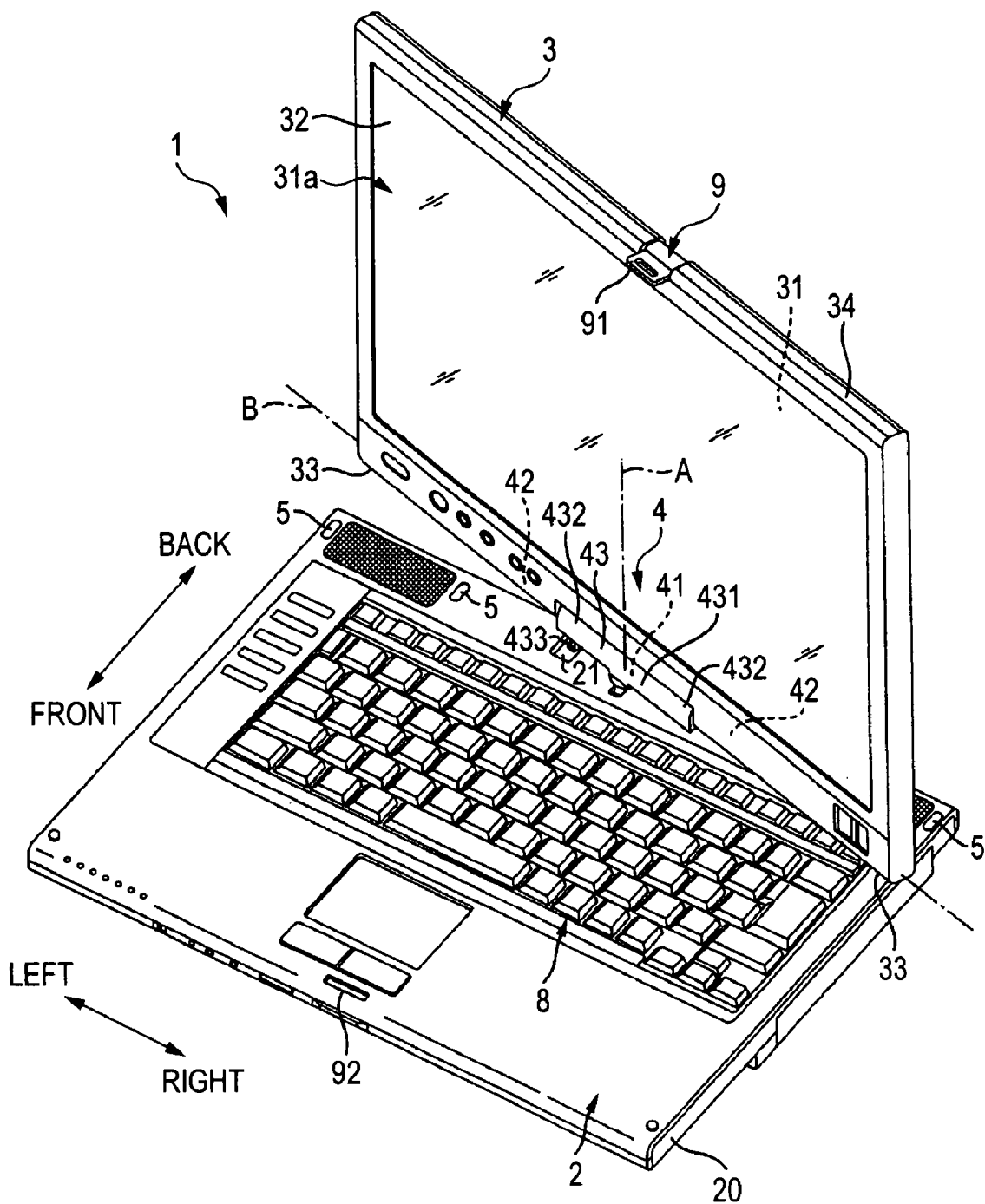
FIG. 1 is an exemplary perspective view of an electronic apparatus according to an embodiment of the invention.

Various embodiments according to the invention will be described hereinafter with reference to the accompanying drawings. In general, according to one embodiment of the invention, an electronic apparatus includes a main body including an input unit placed on an upper face thereof, a display panel including a display surface and a rear surface opposite to the display surface, a hinge section, that joins the display panel to the main body, the hinge section including a pivot shaft pivotably supporting the display panel relative to the input unit and a rotation shaft rotatably holding the display panel relative to the main body, the rotation shaft extending in a different direction from the pivot shaft, and a reception section disposed on the upper face, and including a projection. The projection abuts on an edge of the display panel on which the rotation shaft is disposed, in a direction in which the display panel swings around the pivot shaft.

An electronic apparatus 1 of one embodiment according to the invention will be discussed with reference to FIGS. 1 to 9 by taking a notebook computer as an example. The electronic apparatus 1 shown in FIG. 1 includes a main body 2, a display panel 3, a hinge mechanism 4, and reception members 5. The display panel 3 can be turned from a state in which the display panel 3 is put on the main body 2 with one face turned down through a state in which the display panel 3 is raised relative to the main body 2 to a state in which the display panel 3 is put on the main body 2 with one face turned up. For convenience of explanation of the embodiment, the right, left, and the front viewed from the user side in a state in which the main body 2 is set on a table, etc., are defined as front, the depth is defined as rear (back), and upward and downward are defined in the vertical direction.

The main body 2 has a housing 20 forming a shell and contains a circuit board on which a CPU, etc., is installed, a storage medium, and the like. A keyboard 8 as an example of an input unit is included on the top of the housing 20. The display panel 3 contains a liquid crystal display 31 and a digitizer 32. The liquid crystal display 31 is an example of a display and provides a display surface 31a as one face of the display panel 3. The liquid crystal display 31 may be a plasma display, an organic electroluminescence, a surface conduction type electron emission element display, etc.

The digitizer 32 is an example of an input unit for enabling the user to perform entry operation in association with the image displayed on the display surface 31a of the liquid crystal display 31. A touch panel may be deposited on the display surface 31a of the liquid crystal display 31 in place of the digitizer 32. The face on the opposite side to the display surface 31a is a rear 31b.

The hinge mechanism 4 has a pivot 41, rotation shafts 42, and a pivot support member 43 as shown in FIG. 1 and joins the main body 2 and the display panel 3. The pivot 41 is placed at a center position in the width direction to the back of the main body 2 and rotatably supports the display panel 3 with an axis A extending in a rising direction from the upper face of the main body 2 as the center. Each rotation shaft 42 rotatably supports the display panel 3 with an axis B as the center in a direction raising the display panel 3 relative to the main body 2 from a state in which the display panel 3 is put on the main body 2. The rotation shaft 42 has a rotation friction resistance sufficient for holding the display panel 3 in the attitude at any desired rotation position. The axis B is placed along one side of the back of the display panel 3 put on the main body 2. Therefore, when the display panel 3 rotates on the pivot 41, the rotation shaft 42 rotates together with the display panel 3.

The pivot support member 43 includes a barrel 431 and a suspension frame 432 and joins the pivot 41 and the rotation shaft 42 in a cross state. The barrel 431 is joined in the lower part to the pivot 41. The suspension frame 432 extends along the axis B from the top of the barrel 431 and forms the shape of a letter T together with the barrel 431. The rotation shafts 42 are attached to end parts of the suspension frame 432 extending from side to side.

The pivot support member 43 includes an engagement part 433 extending toward the main body 2 at midpoint in the suspension frame 432 extending to the left of the barrel 431 viewed from the display surface 31a. The engagement part 433 is fitted into a recess part 21 provided in the upper part of the main body 2 in right-left symmetry from the pivot 41 in a state in which the display surface 31a is opposed to the keyboard 8 or a state in which the rear 31b is opposed to the keyboard 8. Accordingly, the rotation angle of the display panel 3 with the pivot 41 as the center is regulated to 180°.

Figure 2:
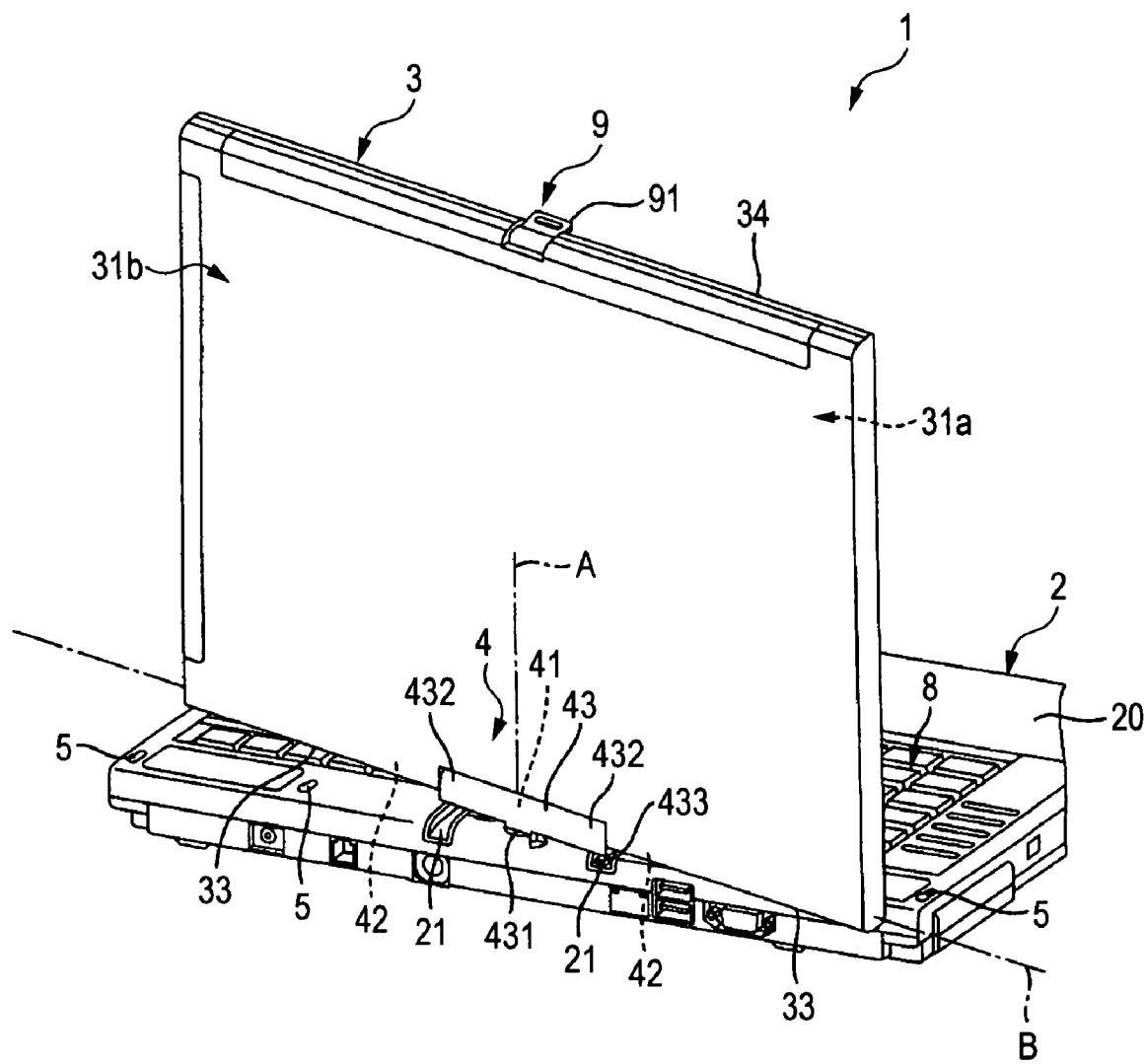
FIG. 2 is an exemplary perspective view of the electronic apparatus shown in FIG. 1 from the rear thereof.
Figure 3:
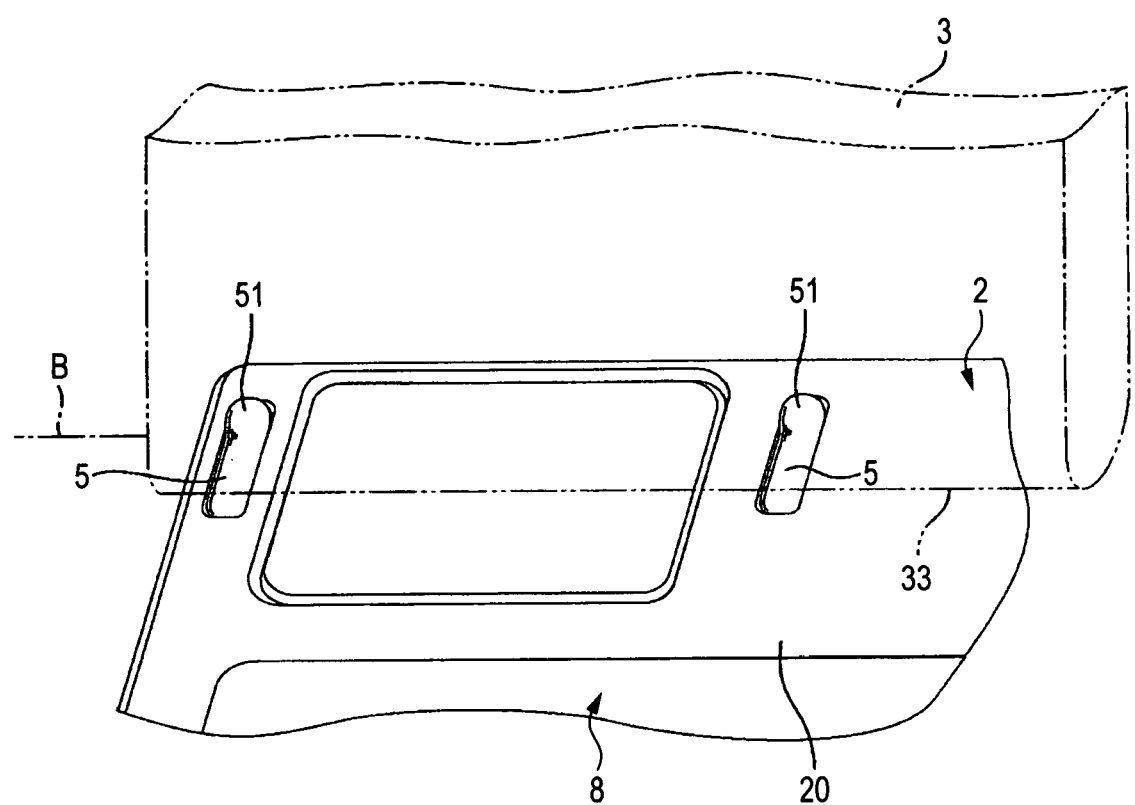
FIG. 3 is an exemplary perspective view of a reception member and its periphery provided on the upper face of the left back of a main body of the electronic apparatus shown in FIG. 1.

The reception members 5 are placed in right-left symmetry with the pivot 41 as the center on the upper face of the back of the main body 2 as shown in FIGS. 1 and 2. The reception members 5 placed on the left are shown in FIG. 3 as a representative. The two reception members 5 are placed with a predetermined spacing. Each reception member 5 is provided long back and forth and has a projection 51 on the back. The projection 51 engages a margin 33 on the side where the rotation shaft 42 is placed in the display panel 3 in the state in which the display surface 31a or the rear 31b is opposed to the keyboard 8 in the orientation along the rotation direction of the display panel 3 with the pivot 41 as the center. In the embodiment, the projection 51 is provided so as to block rotation of the display panel 3 in a direction in which the engagement part 433 escapes from the recess part 21.

Figure 4:
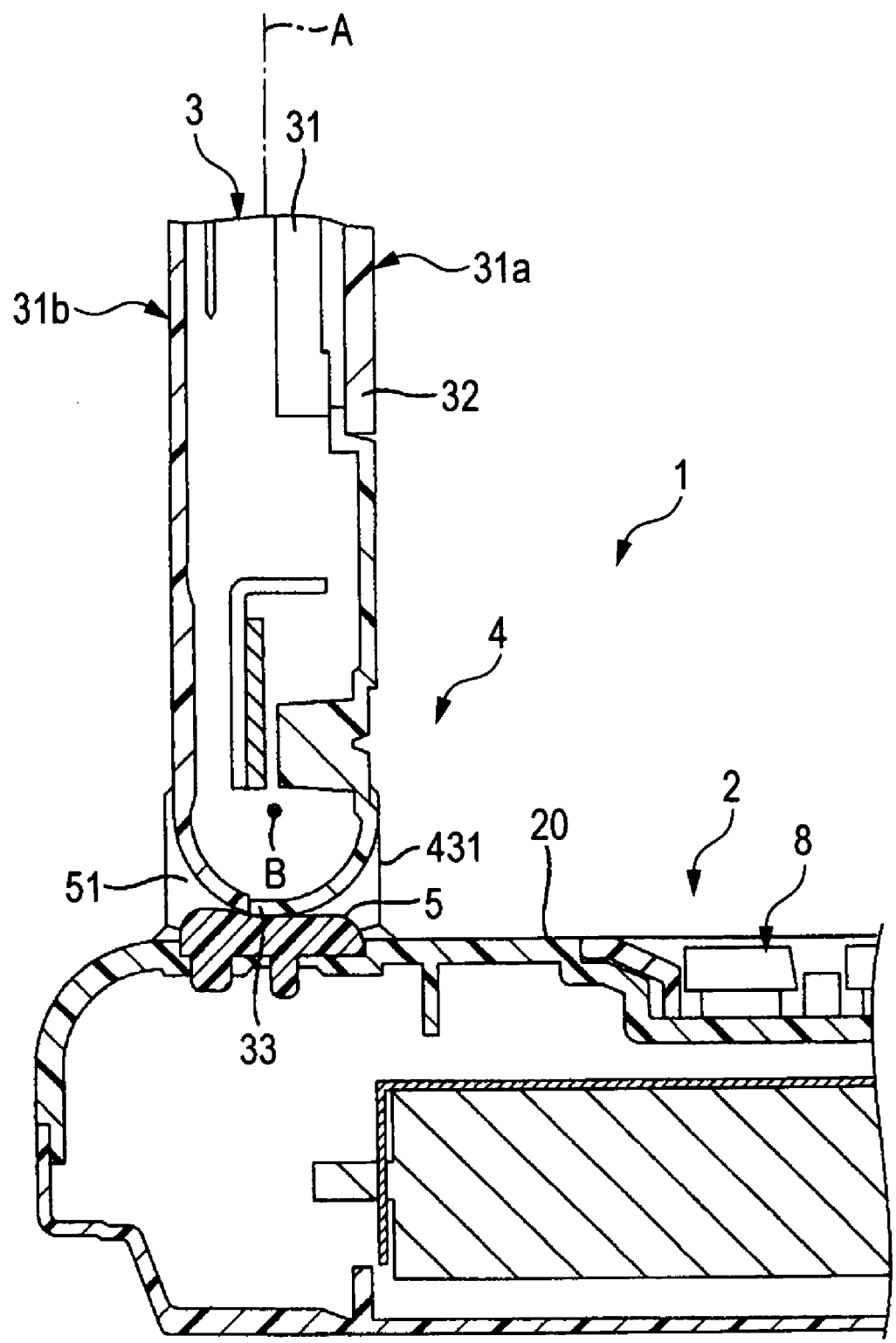
FIG. 4 is an exemplary sectional view through the reception member in a state in which a display surface of a display panel of the electronic apparatus shown in FIG. 1 is opposed to a keyboard.
Figure 5:
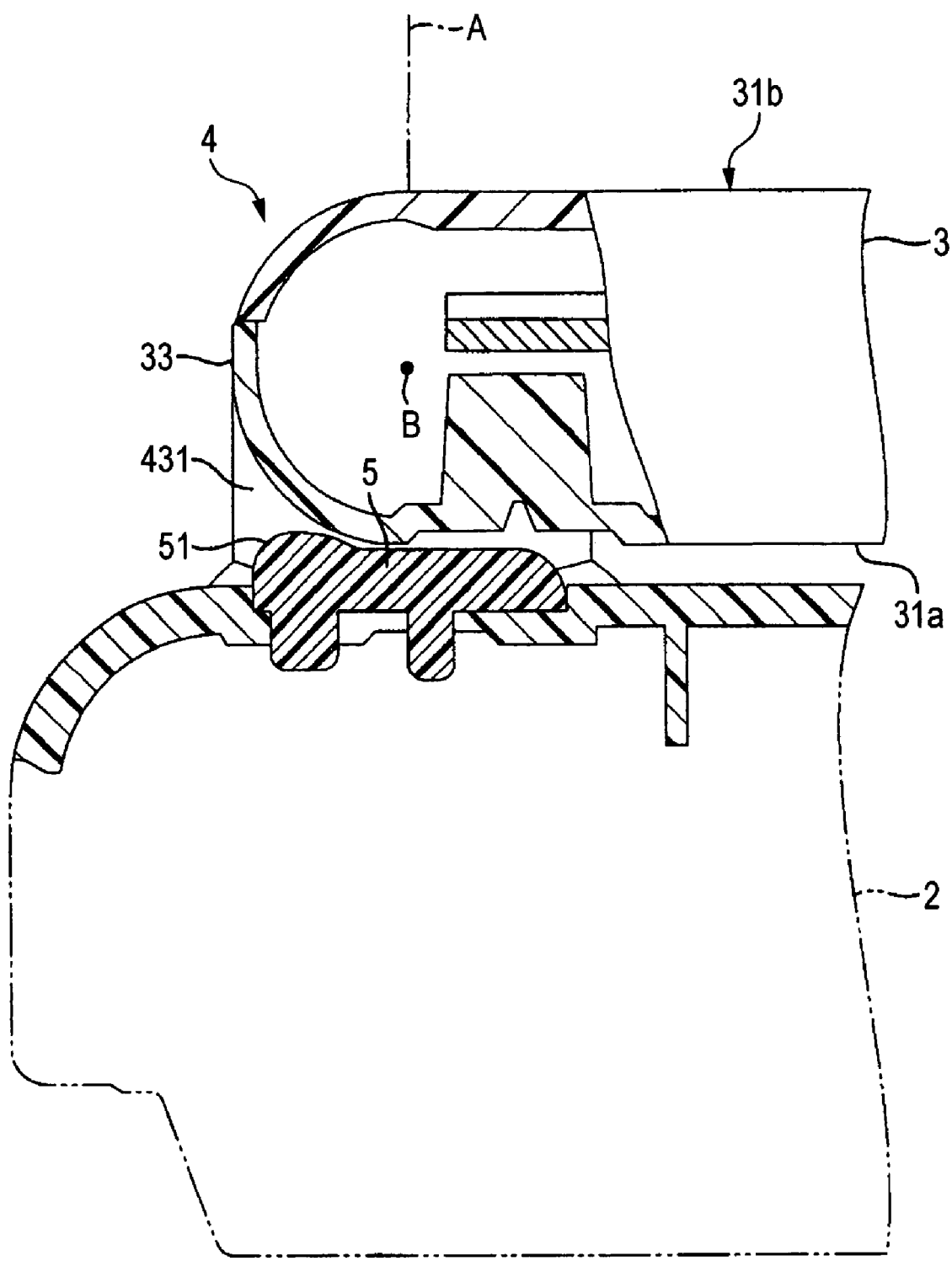
FIG. 5 is an exemplary sectional view through the reception member in a state in which the display surface of the display panel of the electronic apparatus shown in FIG. 1 is turned down to the keyboard.

The margin 33 of the display panel 3 is formed so as to come in contact with the reception member 5 in a state in which the display panel 3 is raised as shown in FIG. 4 and so as to enter a state in which the margin 33 floats slightly from the reception member 5 in a state in which the display panel 3 is put on the main body 2 as shown in FIG. 5. Therefore, the display panel 3 is supported not only by the pivot 41, but also by the reception member 5 in the state in which the display panel 3 is raised; thus the display panel 3 is stable relative to the main body 2.

Figure 6:
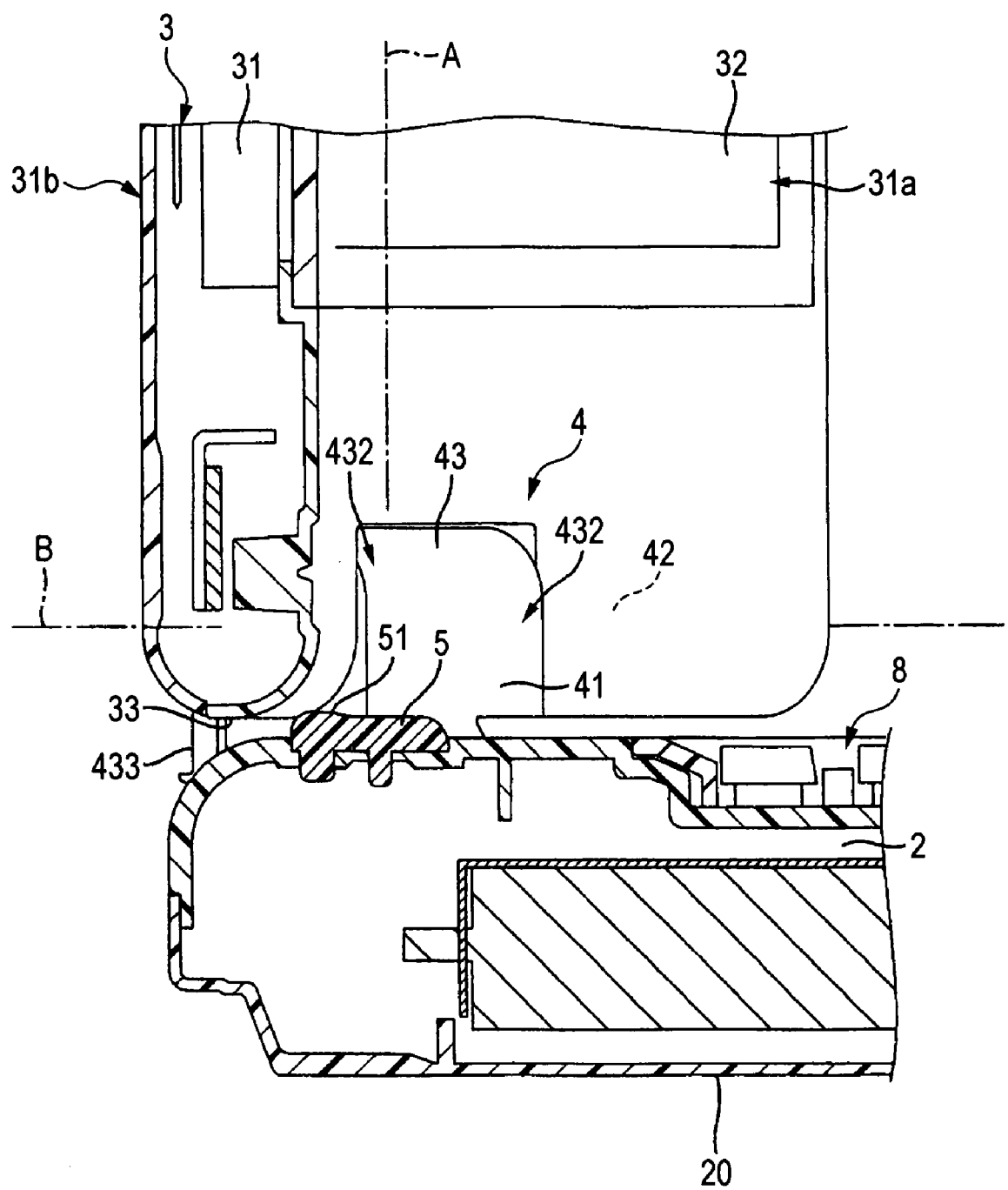
FIG. 6 is an exemplary sectional view of the electronic apparatus taken on line F6-F6 in FIG. 1.
Figure 7:
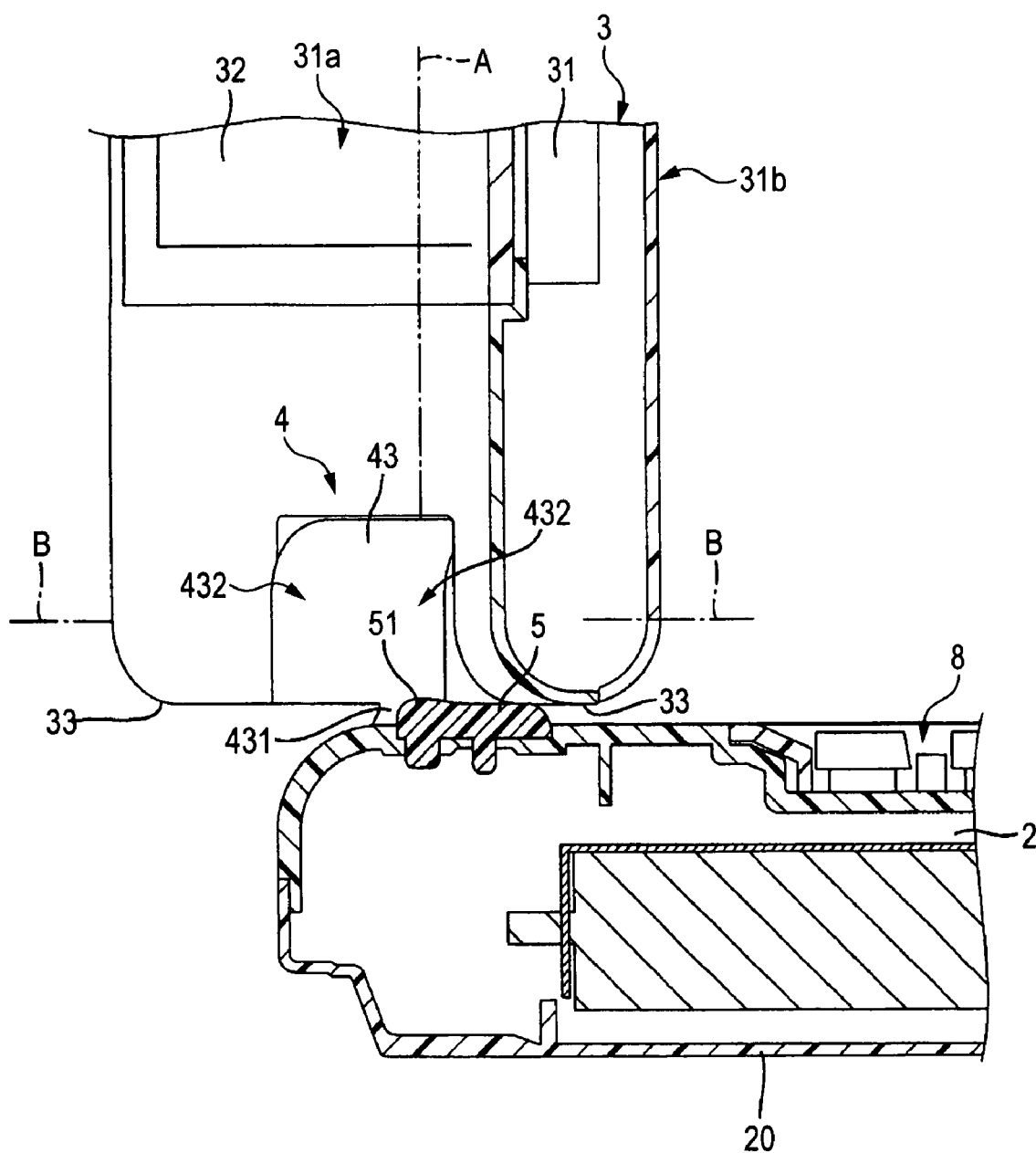
FIG. 7 is an exemplary sectional view of a state in which the display panel of the electronic apparatus shown in FIG. 1 is rotated to a position where the display surface is directed to the rear.
Figure 8:
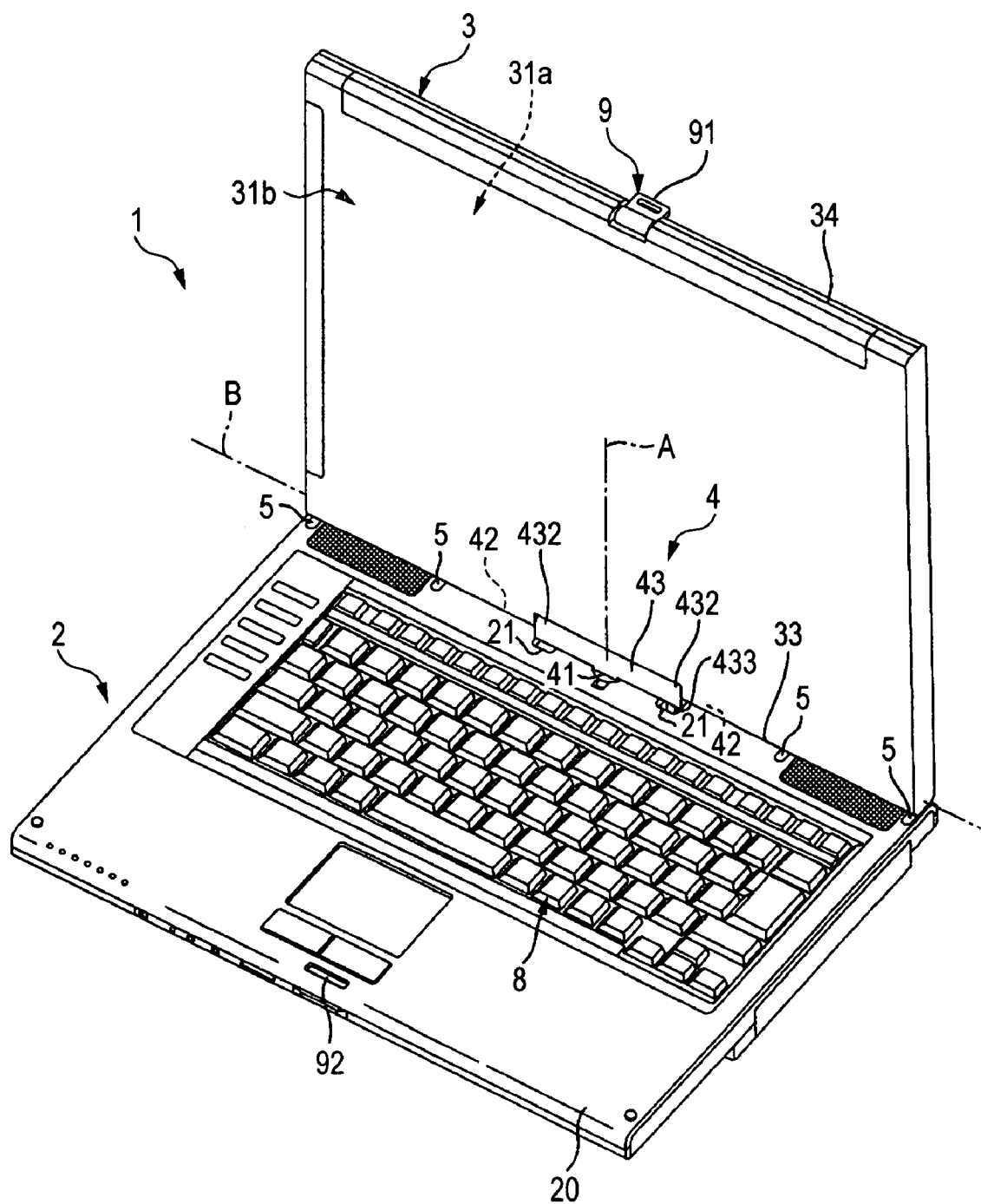
FIG. 8 is an exemplary perspective view of a state in which the display panel of the electronic apparatus shown in FIG. 1 is rotated to a position where the face opposite to the display surface is opposed to the keyboard.
Figure 9:
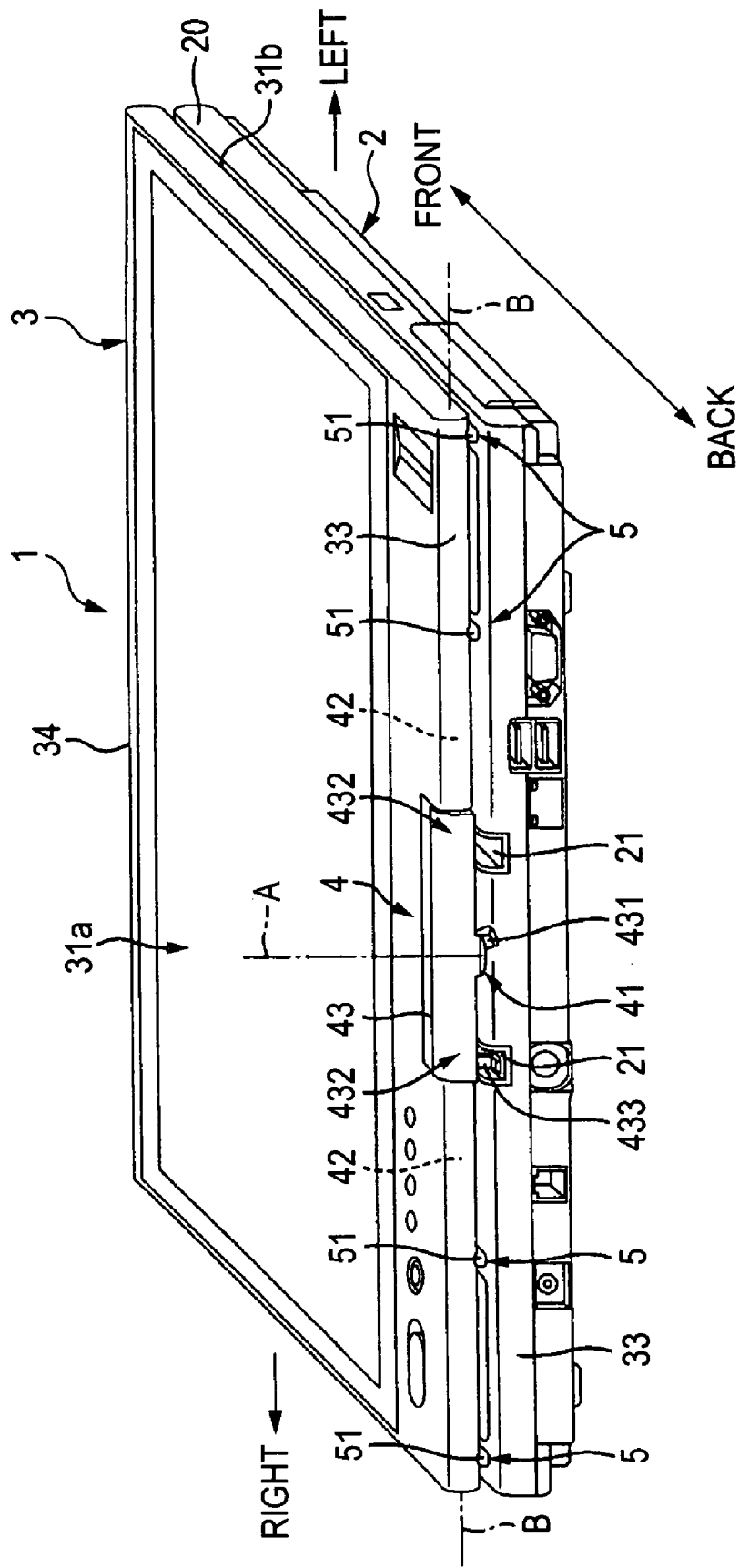
FIG. 9 is an exemplary perspective view of a state in which the display surface of the display panel of the electronic apparatus shown in FIG. 1 is turned up and is turned down to the main body from the rear thereof.

In the described electronic apparatus 1, if the display panel 3 is raised relative to the main body 2 and then is rotated in the direction of turning the display surface 31a to the left viewed from the keyboard 8 side with the pivot 41 as the center, the margin 33 of the display panel 3 climbs over the projection 51 of the reception member 5 as shown in FIG. 6. Further, if the display panel 3 is rotated as shown in FIG. 7, the right margin 33 viewed from the display surface 31a runs onto the reception member 5 from the keyboard 8 side. At the same time, the left margin 33 of the display surface 31a climbs over the projection 51 of the reception member 5 placed on the right of the back of the main body 2 and enters a state shown in FIG. 8. If the display panel 3 is turned down so that it is put on the main body 2 from the state, the display panel 3 enters a state shown in FIG. 9.

In contrast, if the display panel 3 is rotated in the opposite direction with the pivot 41 as the center to direct the display surface 31a to the keyboard 8 side, the display panel 3 enters the state shown in FIG. 6 from the state shown in FIG. 7 and the left margin of the display panel 3 viewed from the display surface 31a climbs over the projection 51 and runs onto the reception member 5. Thus, as it climbs over the projection 51 of the reception member 5, the person turning the display panel 3 is given a click sense, whereby the person can be made to understand sensuously the completion of the turning operation of the display panel 3. The user is given a click sense at the beginning and the last of the operation of rotating the display panel 3 with the pivot 41 as the center, whereby the user can intuitively acknowledge the fact that the display panel 3 can be pivoted correctly.

To raise the display panel 3 relative to the main body 2, to turn down the display panel 3 relative to the main body 2, or to adjust the angle in a state in which the display panel 3 is raised, the user grasps and operates a margin 34 of the opposed side to the margin 33 of the display panel 3 where the rotation shaft 42 is provided. If the user grasps and operates the portion at a distance from the pivot 41 in the radial direction of the axis A, the display panel 3 receives a rotation force with the pivot 41 as the center.

In this case, if the display panel 3 receives the rotation force on the side not regulated by the engagement part 433, the projection 51 of the reception member 5 engages the margin 33 of the display panel 3. Therefore, the user can smoothly rotate the display panel 3 with the rotation shaft 42 as the center.

When the margin 33 of the display panel 3 engages the reception member 5, the display panel 3 is positioned in a state in which the display surface 31a or the rear 31b is opposed to the keyboard 8. Therefore, a fit piece 91 of a latch mechanism 9 provided in the margin 34 of the display panel 3 on the opposed side to the rotation shaft 42 is fitted into a fit hole 92 made in the main body 2 without a position shift.

Figure 10:
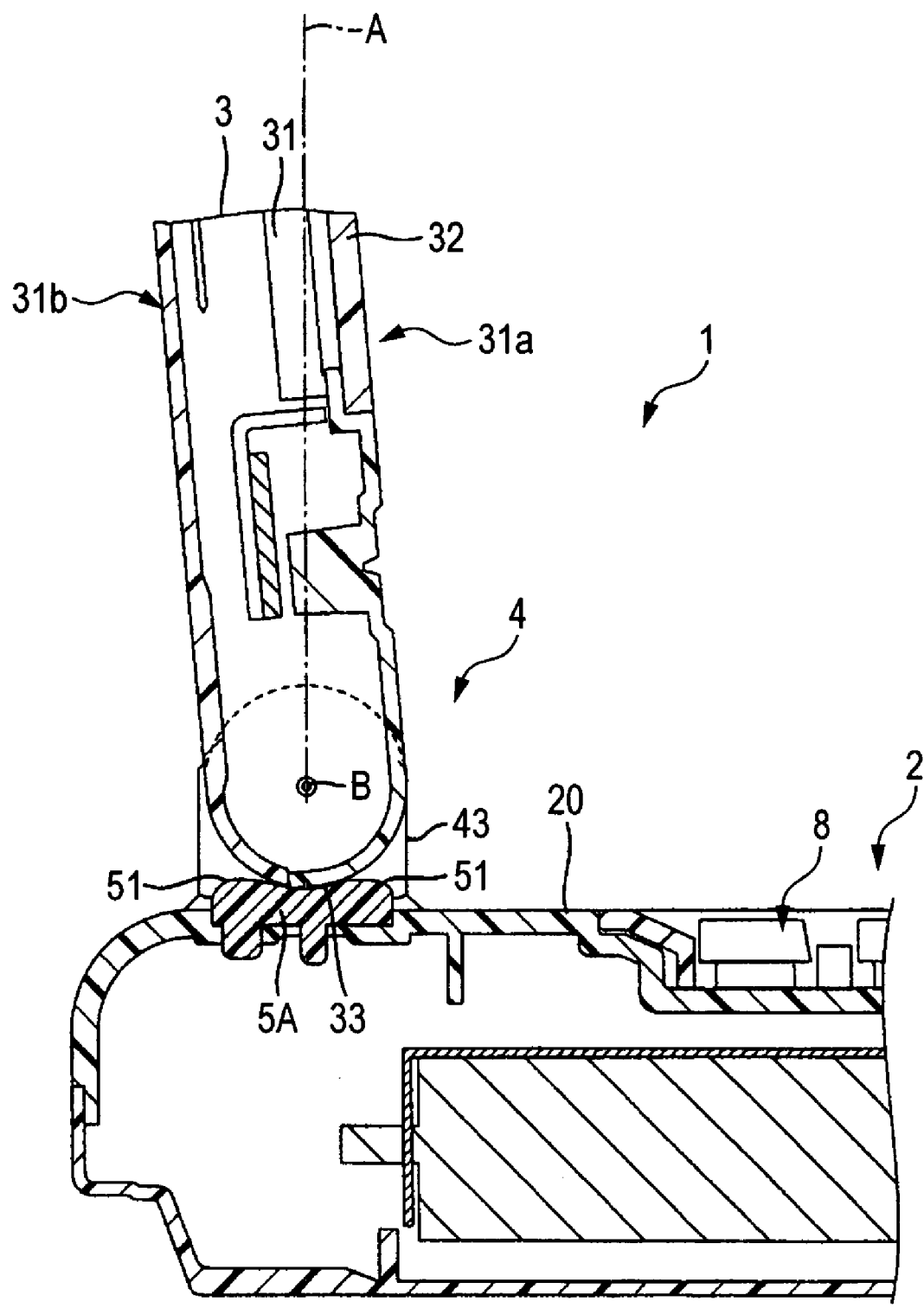
FIG. 10 is an exemplary sectional view through a reception member of an electronic apparatus according to another embodiment of the invention.

In the embodiment, the projection 51 of the reception member 5 is provided at a back position of the margin 33 of the display panel 3 in the state in which the display surface 31a or the rear 31b is opposed to the keyboard 8. In contrast, a reception member 5A having a projection 51 on both sides of the front and the back of the margin 33 of the display panel 3 may be provided as shown in FIG. 10. The reception member 5A thus formed is provided only on the right or the left of the main body 2, whereby the same effect as the reception members 5 in the embodiment described above can be provided.

According to the embodiments of the present invention, it is possible to provide an electronic apparatus for enabling the user to smoothly raise a display panel put on a main body and pivot the raised display panel.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a main body including an input unit placed on an upper face thereof;
   a display panel including a display surface and a rear surface opposite to the display surface;
   a hinge section that joins the display panel to the main body, the hinge section including a pivot shaft pivotably supporting the display panel relative to the input unit and a rotation shaft rotatably holding the display panel relative to the main body, the rotation shaft extending in a different direction from the pivot shaft; and
   a reception section disposed on the upper face, and including a projection;
   wherein the projection abuts on an edge of the display panel on which the rotation shaft is disposed, in a direction in which the display panel swings around the pivot shaft.

2. The electronic apparatus according to claim 1, wherein the edge abuts the reception section when the display panel is raised relative to the main body, and floats relative to the reception section when the display panel is overlaid on the main body.

3. The electronic apparatus according to claim 1,
   wherein the edge including a front side facing the input unit and a back side opposite to the front side; and
   wherein the projection abuts the back side.

4. The electronic apparatus according to claim 1, wherein the reception section includes a plurality of reception sections arranged symmetrically with the pivot shaft.

5. The electronic apparatus according to claim 1,
   wherein the edge includes a front side facing the input unit and a back side opposite to the front side;
   wherein the reception section includes two projections arranged in the direction in which the display panel swings around the pivot shaft; and
   wherein both of the two projections abut the front side and the back side respectively.

6. An electronic apparatus comprising:
   a main body including an input unit;
   a display panel including an edge, a display surface and a rear surface opposite to the display surface;
   a hinge section coupled to the display panel and the main body, the hinge section including a pivot shaft pivotably supporting the display panel relative to the input unit and a rotation shaft rotatably holding the display panel relative to the main body, the rotation shaft extending in a different direction from the pivot shaft; and
   a reception section including a projection, the projection abuts on the edge of the display panel on which the rotation shaft is disposed, in a direction in which the display panel swings around the pivot shaft.

7. The electronic apparatus according to claim 6, wherein the edge of the display panel abuts the reception section when the display panel is raised relative to the main body, and floats relative to the reception section when the display panel is overlaid on the main body.

8. The electronic apparatus according to claim 6, wherein the edge of the display panel includes a front side facing the input unit and a back side opposite to the front side.

9. The electronic apparatus according to claim 8, wherein the projection abuts the back side.

10. The electronic apparatus according to claim 6, wherein the reception section includes a plurality of reception sections arranged symmetrically with the pivot shaft.

11. The electronic apparatus according to claim 6, wherein the edge of the display panel includes a front side facing the input unit and a back side opposite to the front side.

12. The electronic apparatus according to claim 6, wherein the reception section includes two projections arranged in the direction in which the display panel swings around the pivot shaft.

13. The electronic apparatus according to claim 1, wherein both of the two projections abut the front side and the back side respectively.

* * * * *